United States Patent [19]

Foley, Jr. et al.

[11] Patent Number: 6,126,726

[45] Date of Patent: *Oct. 3, 2000

[54] GENERATOR HYDROGEN PURGE GAS ECONOMIZER WITH MEMBRANE FILTER

[75] Inventors: Robert Joseph Foley, Jr.; Owen Russell Snuttjer, both of Oviedo, Fla.

[73] Assignee: Siemens Westinghouse Power Corporation, Orlando, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/110,523

[22] Filed: Jul. 6, 1998

[51] Int. Cl.$^7$ ..................................... B01D 53/22
[52] U.S. Cl. ..................................... 96/11; 95/56
[58] Field of Search ................. 95/55, 56; 96/4, 96/11

[56] References Cited

U.S. PATENT DOCUMENTS

| | | | |
|---|---|---|---|
| 2,824,620 | 2/1958 | de Rosset | 95/56 |
| 3,350,846 | 11/1967 | Makrides et al. | 95/56 |
| 3,447,288 | 6/1969 | Juda et al. | 96/11 |
| 4,531,070 | 7/1985 | Kuhn | 310/56 |
| 5,069,794 | 12/1991 | Haag et al. | 210/650 |
| 5,139,541 | 8/1992 | Edlund | 95/56 |
| 5,217,506 | 6/1993 | Edlund et al. | 95/56 |
| 5,259,870 | 11/1993 | Edlund | 95/56 |
| 5,393,325 | 2/1995 | Edlund | 95/56 |
| 5,498,278 | 3/1996 | Edlund | 96/11 |
| 5,557,153 | 9/1996 | Zimmermann | 310/56 |
| 5,676,736 | 10/1997 | Crozel | 95/55 X |

FOREIGN PATENT DOCUMENTS

| | | |
|---|---|---|
| 1474-802 | 4/1989 | Russian Federation . |
| WO 94/10740 | 5/1994 | WIPO . |

*Primary Examiner*—Robert H. Spitzer
*Attorney, Agent, or Firm*—Eckert Seamans Cherin & Mellott, LLC

[57] ABSTRACT

A turbine generator hydrogen filtration system having an improved membrane filter for the removal of gases and particulates is provided. The system comprises a membrane filter operably connected with defoaming tanks. The hydrogen stream is routed through an improved membrane filter where air and other contaminants such as oil are removed. The hydrogen is recirculated into the hydrogen cooled generator. The membrane filter employed in the system is one of several palladium based membrane filters which effectively remove air and other contaminants and provide high hydrogen through-put.

3 Claims, 2 Drawing Sheets

GENERATOR HYDROGEN PURGE GAS ECONOMIZER WITH MEMBRANE FILTER

FIELD OF THE INVENTION

The present invention relates generally to filtration systems. More particularly, the present invention relates to a hydrogen purge gas economizer system having an improved membrane filter for the removal of air, oil, and particulates from a hydrogen stream.

BACKGROUND OF THE INVENTION

Generally, large generators are filled with pressurized hydrogen to cool the generator. The purity of the hydrogen dictates its effectiveness in cooling the generator; the higher the purity, the more efficiently the hydrogen cools the generator. Typically, the hydrogen has purity levels in excess of 95%. When purity levels fall below this level of purity, the cooling characteristics of the hydrogen are significantly reduced.

A significant source of contaminants in the hydrogen stream is oil which enters the hydrogen from the lubrication oil and exists in the hydrogen in the form of small droplets and gaseous molecules. Air is often trapped in the oil droplets and is thereby also suspended in the hydrogen stream. Impurities may also comprise styrene, anomine, and various other gases which emanate from the epoxies which are used throughout the generator. Solid particulates generated by the heating of non-metallic components might also be suspended in the hydrogen.

In addition to adversely effecting the cooling qualities of the hydrogen, impurities can adversely effect the electrical quality of the insulating components of the generator. Also, these impurities increase the density of the mixture of gases in the generator and thereby add to windage loss. Further, it should be noted that hydrogen has a greater tendency to explode when found in purity levels of 4 to 74%; thus, lower purity levels increase the possibility of explosion.

A significant and sometimes primary cause for the existence of oil mist and air within the cooling hydrogen of a turbine generator is the leakage of oil-laden gas from the generator's defoaming tanks into the generator's stator housing through the generator rotor's labyrinth seals. Many types of electrical generators utilize gland seals to contain hydrogen within the generator's frame. These gland seals operate by surrounding a portion of the generator rotor, with a very small gap between the stationary gland seal and the rotating rotor, and injecting a stream of oil in the interface therebetween. The passage of oil in an inboard axial direction prevents hydrogen gas from escaping from within the generator frame through this interface. Upon leaving this interface region of the gland seal, the oil is collected in a defoaming tank and recirculated within the oil system of the generator. These gland seals are located at both the turbine and exciter end of the rotor shaft and are provided with a deflector which prevents the oil from splashing directly against the labyrinth seals as it is ejected from the gland seals. Although the deflectors are generally successful in this function, it is possible that a quantity of oil can be ejected from the gland seals with sufficient velocity to enter the labyrinth seals.

A more severe cause of oil contamination of the hydrogen coolant is the defoaming tank itself. The defoaming tank contains oil in both liquid and vapor form, i.e. oil particles suspended in the hydrogen gas. The defoaming tank contains a quantity of liquid oil at its bottom portion which will eventually be recirculated through the generator's oil system. Above this liquid oil is a mixture of hydrogen gas with oil mist dispersed throughout it and with gaseous oil molecules mixed therethrough. This contaminated gas within the defoaming tank is separated from the cooling hydrogen which exists within the generator's frame by the above-mentioned labyrinth seals. However, if the pressure within the defoaming tank exceeds that of the hydrogen gas on the opposite side of the labyrinth seal, the contaminated gas from above the oil in the defoaming tank can flow through the labyrinth seal into the cooling region of the generator frame and contaminate the much purer quantity of hydrogen used to cool the generator.

Although the pressure of the defoaming tank is intended to be kept at a value less than that of the hydrogen within the generator frame. various factors, including a rise of the oil temperature within the defoaming tank, can cause the pressure within the defoaming tank to exceed that of the hydrogen gas located within the generator. As described above, this increase in gas pressure within the defoaming tank can trigger the harmful flow of contaminated gas through the labyrinth seal and into the generator frame causing contamination of the generator's hydrogen cooling system.

Various methods have been developed to address the problems associated with impurities in the cooling hydrogen stream. Some have proposed vacuum treating the sealing oil to remove impurities. In such systems, a vacuum maintains hydrogen purity by removing gases including hydrogen from the oil prior to the oil entering the seal ring. The major drawback of such systems is the amount of hydrogen that is consumed. When the de-gassed oil enters the seal ring and contacts the hydrogen atmosphere, the oil has the potential to absorb 5–7% hydrogen (by volume) prior to exiting the seal area. Because the system consumes large amounts of hydrogen, it is therefore not feasible for use on larger generators.

It has also been proposed to employ a separate sealing oil circuit in equilibrium with the generator atmosphere. This method is prevalent in today's hydrogen cooled generators. Such systems maintain high purity by utilizing two separate oil systems, one for untreated air and one for the treated hydrogen. However, employing two separate systems increases cost and operational difficulty.

One method of reducing impurities involves simply minimizing oil flow into the generator. This can be accomplished by reducing operating clearances of the seal ring and oil pressures. This method has resulted in excessive oil temperatures which has lead to thermal instability of the seal ring. Thus, reduction of clearances has not proven a viable option to maintain high hydrogen purity.

Still another suggested method of reducing impurities involves continuously purging all hydrogen from the system and replacing the hydrogen with fresh hydrogen from exterior to the system. Such systems are expensive to operate due to the costs associated with providing a constant supply of new hydrogen.

As an alternative to purging all hydrogen from the generator, it has been proposed to filter the hydrogen and recirculate the filtered hydrogen into the generator. U.S.

U.S. Pat. No. 4,531,070 ('070 Patent) entitled "Turbine Generator Hydrogen Filtration System," which is assigned to the assignee of the present invention and the contents of which are hereby incorporated by reference in their entirety, discloses such a system. The '070 patent discloses a filtration mechanism directed toward removing oil, gas-born particulates and gaseous contaminates such as styrene and anomine. The filtering mechanism disclosed in the '070

Patent comprises the following items: an air filter for removing solid particles one micron and larger from the gaseous stream; a coalescing oil filter tank which operates to coalesce very small particles of oil into larger particles or droplets; and a gaseous contaminant removing means for removing the oil droplets as well as gaseous contaminates such as styrene and anomine from the hydrogen stream. Thus, the filtering mechanism of the '070 Patent comprises three different filtering devices directed at removing oil, gas-borne particles, and gases such as styrene and anomine.

Although the filter of the '070 Patent is effective at removing most oil, air-borne particles, as well as styrene and anomine, it does not operate to remove air from the hydrogen stream. Air has the same deleterious effects as other contaminants and therefore optimally should be removed from the hydrogen stream. Further, the filtering mechanism of the '070 Patent comprises three different devices and therefore represents an inefficient filtering method.

Additionally, the coalescing filter of the '070 Patent cannot maintain adequate purity levels without employing additional treatment systems such as the vacuum system or separate sealing oil circuit described above.

It is therefore desirable to provide a more compact and efficient system that filters not only oil, particulates, and various gases, but also removes air from the hydrogen stream without the use of additional treatment systems.

SUMMARY OF THE INVENTION

Accordingly, there is disclosed a hydrogen cooled generator system having a hydrogen gas economizer, and a membrane filter for removing contaminants such as oil and gases including air from a hydrogen stream. The membrane filter comprises a membrane having palladium therein for removing air as well as other contaminants from the hydrogen stream.

According to one embodiment, the membrane filter may comprise the following elements: a first layer of palladium alloy for separating hydrogen from other gases such as air; a second layer integrally formed with said first layer for eliminating hydrogen flux; and a third layer of base metal for mechanical support.

According to another embodiment, the membrane filter has a membrane comprising the following elements: a first layer of palladium alloy for disassociating molecular hydrogen; a layer of refractory, body-centered cubic metal for mechanical support; and a second layer of palladium alloy for reassociating molecular hydrogen.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF THE PREFERRED EMBODIMENTS

A turbine generator hydrogen purge gas economizer with the above-mentioned beneficial features in accordance with a presently preferred exemplary embodiment of the invention will be described below with reference to FIGS. 1 through 4. It will be appreciated by those of ordinary skill in the art that the description given herein with respect to those figures is for illustrative purposes only and is not intended in any way to limit the scope of the invention. All questions regarding the scope of the invention may be resolved by referring to the appended claims.

Figure 1:
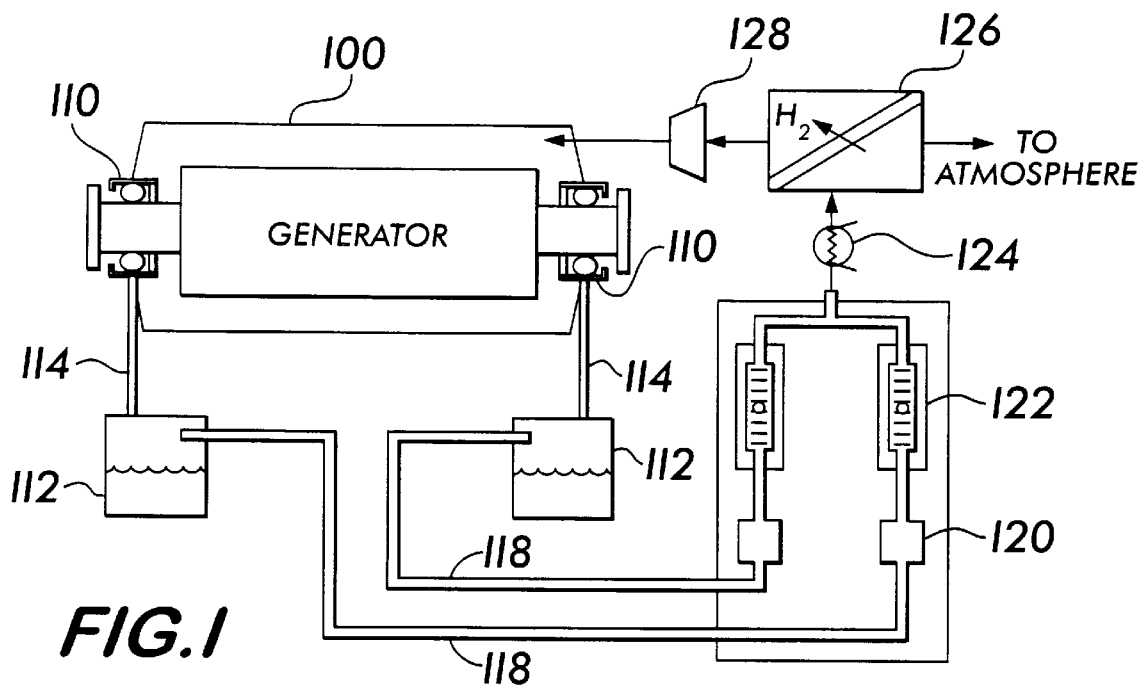
FIG. 1 is a schematic diagram of a generator hydrogen purge gas economizer in accordance with the present invention.

The present invention provides a generator hydrogen purge gas economizer having a membrane filter for removal of contaminant gases and particulates. The hydrogen economizer system can process hydrogen contaminated with up to 10% air and oil vapor. FIG. 1 provides a schematic diagram of a generator hydrogen gas economizer system in accordance with the present invention. A hydrogen atmosphere of approximately 30 to 75 psig is maintained in generator 100 via use of a bronze seal ring which floats on pressurized oil. The oil pressure is maintained at about 8 to 12 psig above the pressure of the hydrogen atmosphere pressure. Although a seal can be maintained at 3 psig over gas pressure, 8–12 psig is employed to maintain a seal and provide a margin of safety.

As shown, seal ring areas 110 interact with defoaming tanks 112 via conduits 114. A hydrogen gas mixture is purged from seal ring areas 110 and settles in defoaming tanks 112. The purged hydrogen gas mixture contains impurities such as air and oil. As noted above, contaminated hydrogen mixture fills the area above the condensed liquid oil in the defoaming tank. The pressure of the contaminated hydrogen in the defoaming tank is in the range of about 30 to 75 psig with a dew-point as high as 60° F. The hydrogen gas mixture is evacuated via conduits 118. Control valves 120 control the flow of hydrogen gas mixture through conduits 118. Flowmeters 122 measure the flow of hydrogen gas mixture out of the defoaming tanks and through conduits 118. The hydrogen gas mixture is evacuated from defoaming tanks 112 at a rate of up to 1000 standard cubic feet per day (SCFD) at about from 32 to 250° F. The hydrogen gas mixture is compressed and heated in heater device 124. Thereafter, the hydrogen gas mixture enters hydrogen purification filter 126. A purified hydrogen stream exits filter 126 and enters compressor 128. The compressed hydrogen is released into generator 100. Compression of the purified hydrogen stream is necessary to maintain flow into generator 100. The impurities removed by filter 126 are released into the atmosphere.

Figure 2A:
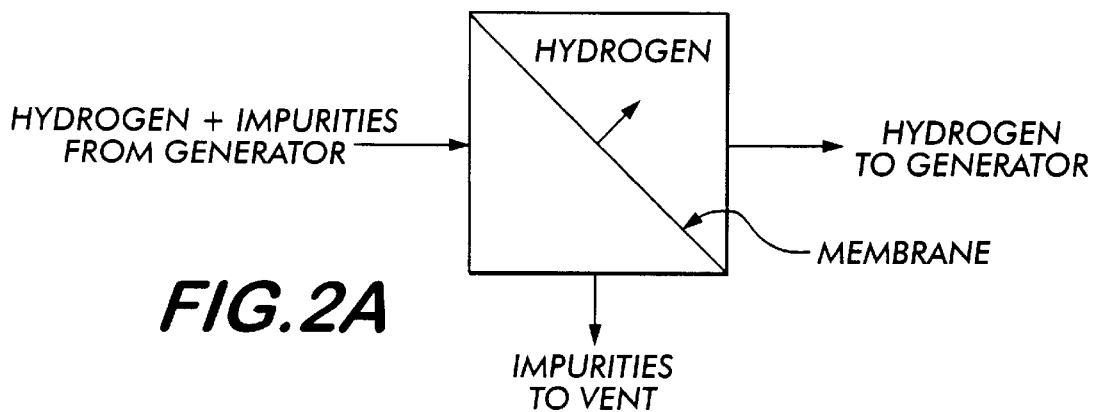
FIG. 2a illustrates the operation of a membrane employed in a hydrogen filter for use in the gas economizer of FIG. 1.
Figure 2B:
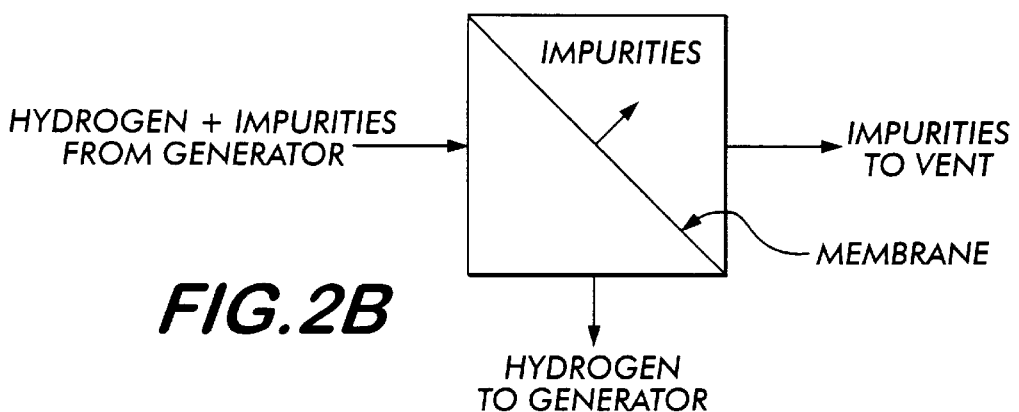
FIG. 2b illustrates an alternative operation of a membrane employed in a hydrogen filter for use in the gas economizer of FIG. 1.

The filter employed in the above described system is a membrane type filter, i.e. a membrane operates to allow certain components of a gas stream to permeate while other components of the gas stream do not permeate the membrane. FIGS. 2a and 2b illustrate alternative embodiments of the membrane filter. As shown in FIG. 2a, membrane 140 may be employed to pass hydrogen through the membrane while impurities are filtered out. Alternatively, as illustrated in FIG. 2b, the contaminants may be allowed to pass through the membrane while the hydrogen is filtered out. In either embodiment, nearly pure hydrogen is filtered from the air, oil, and particulate contaminants.

Figure 3:
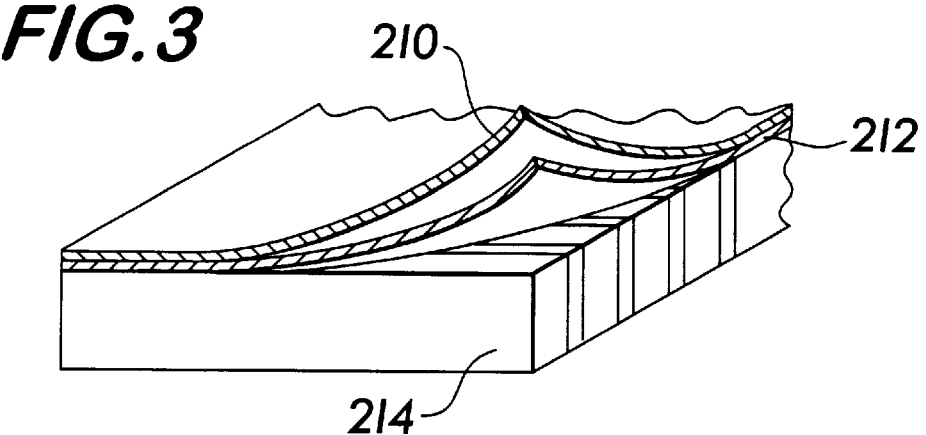
FIG. 3 depicts the layered composition of a membrane employed in a hydrogen filter for use in the gas economizer of FIG. 1.

Various membranes have been developed which may be employed in a filter for use in the above described economizer invention. One such membrane is shown in FIG. 3. As shown, the membrane consists of thin layer 210 of platinum or palladium alloy, intermediate layer 212, and base-metal layer 214. Palladium alloy layer 210 separates hydrogen from other gases such as air. Intermediate layer 212, which may be composed of $SiO_2$ or $Al_2O_3$ eliminates the rapid hydrogen-flux decline exhibited by earlier metal-on-metal membranes and the mechanical failure typical of metal-on-metal ceramic membranes. Thus, intermediate layer 212 prevents intermetallic diffusion. Base metal layer 214 simply provides mechanical support. A membrane filter in accordance with that described can be purchased from Bend Research, Inc. of Bend Oregon.

Membrane filters employing a membrane such as that described with reference to FIG. 3 provide the following benefits: exceptionally high selectivity for hydrogen; high hydrogen fluxes; excellent stability at high temperatures; and attractive economics for many applications due to excellent membrane performance and minimal use of expensive noble metals.

Figure 4:
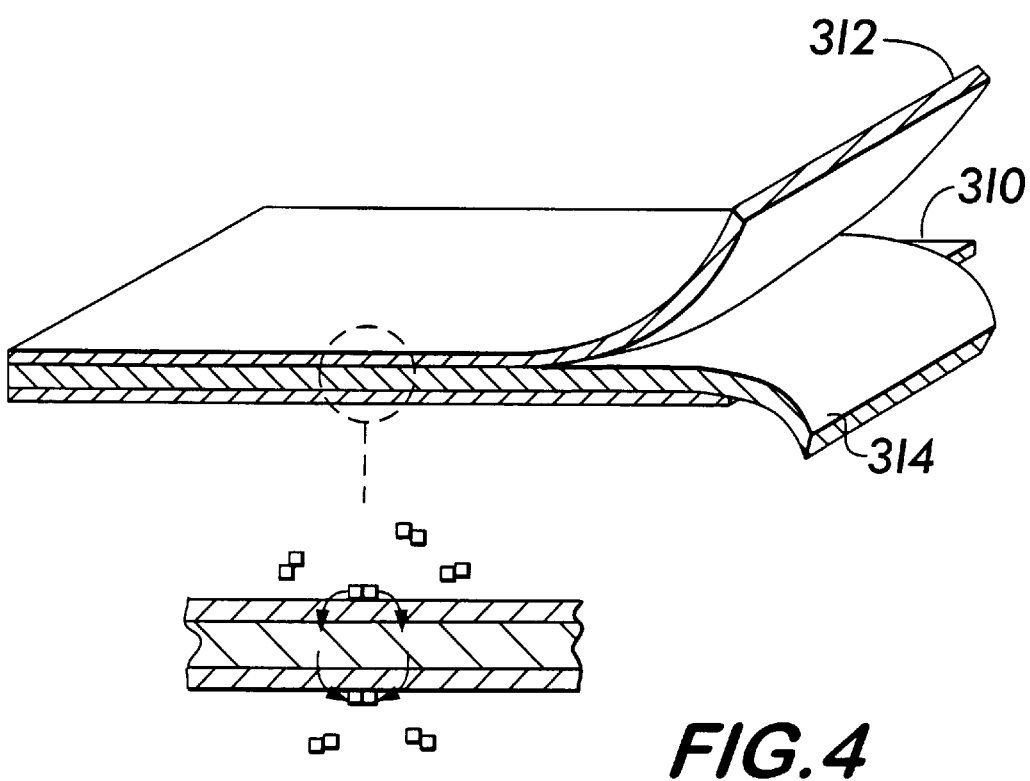
FIG. 4 depicts an alternative membrane employed in a hydrogen filter for use in the gas economizer of FIG. 1.

A second membrane for use in a filter to be employed in a hydrogen economizer of the preferred embodiment is shown in FIG. 4. As shown, thin layer 310 of refractory, body-centered cubic (bcc) metal is coated on both sides with layers 312 and 314 of a face-centered cubic (fcc) metal, preferably palladium. First layer 312 of palladium operates to disassemble molecular hydrogen. The disassociated hydrogen is transported through refractory metal bulk layer 310, which is typically composed of a Group V metal, and reassociated by layer 314 of palladium.

A membrane such as that depicted in FIG. 4 has several advantages. First, because bulk diffusion is not limited by the face centered cubic structure of palladium, the membrane of FIG. 4 provides greater overall hydrogen fluxes. As a consequence, the membrane structure can be thicker, yielding improved mechanical stability while still providing acceptable gas fluxes. Second, because refractory metals are significantly cheaper than palladium and only a surface layer of palladium is required, these structures are much more economical. Finally, while the Group V metals are also subject to embrittlement, this only becomes a problem at well below room temperature. Further, should the surface palladium layer develop defects, this would not render the membrane useless since it would merely expose a small area of the refractory metal.

The present invention may be embodied in other specific forms without departing from the spirit or essential attributes thereof. For example, the membrane filter may be one of several palladium based membranes. Further, the number and types of defoaming tanks, control valves, and flow meters may vary. Accordingly, reference should be made to the appended claims, rather than to the foregoing specification, as indicating the scope of the invention.

What is claimed is:

1. A hydrogen gas cooled generator system with associated defoaming tanks through which hydrogen passes, the system having a membrane filter for removing contaminates of oil and air from a hydrogen stream used to cool the generator, wherein said membrane filter consists of a membrane consisting of:

a first layer of palladium alloy for disassociating molecular hydrogen;

a layer of refractory, body-centered cubic metal for mechanical support; and a separate second layer of palladium alloy for reassociating molecular hydrogen, where the defoaming tanks contain hydrogen contaminated with up to 10% air and oil vapor, which contaminated hydrogen is in communication with the membrane filter, where the defoaming tanks are associated with generator seals and contain a contaminated hydrogen mixture under pressure above condensed liquid oil, which contaminated hydrogen is in communication with the membrane filter through conduits, where a heater is disposed in the conduit system between the defoaming tanks and the membrane filter where oil and air are filtered out and only hydrogen is transported through the membrane, for hydrogen contaminated with up to 10% air and oil vapor, and the mechanical support is disposed between the palladium alloy layers, the membrane is of a thickness effective to provide mechanical stability while still providing gas flux, and where the palladium alloy layers provide a face centered cubic structure, and are then surface layers which do not limit bulk diffusion of hydrogen.

2. The hydrogen cooled generator system of claim 1, where the layer of refractory metal is a Group V metal, and where control valves control the flow of hydrogen gas mixture through the conduits.

3. The hydrogen cooled generator system of claim 1, where nearly pure hydrogen is filtered from the air, oil and particulate contaminates.

\* \* \* \* \*